United States Patent
Li

(10) Patent No.: US 10,338,719 B2
(45) Date of Patent: Jul. 2, 2019

(54) PRESSURE SENSING APPARATUS AND ELECTRONIC DEVICE HAVING SAID PRESSURE SENSING APPARATUS

(71) Applicant: SHENZHEN NEW DEGREE TECHNOLOGY CO., LTD., Shenzhen, Guangdong (CN)

(72) Inventor: Hao Li, Guangdong (CN)

(73) Assignee: SHENZHEN NEW DEGREE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/579,443

(22) PCT Filed: Feb. 5, 2016

(86) PCT No.: PCT/CN2016/073646
§ 371 (c)(1),
(2) Date: Dec. 4, 2017

(87) PCT Pub. No.: WO2016/192409
PCT Pub. Date: Dec. 8, 2016

(65) Prior Publication Data
US 2018/0164938 A1   Jun. 14, 2018

(30) Foreign Application Priority Data
Jun. 5, 2015  (CN) .......................... 2015 1 0306889

(51) Int. Cl.
*G06F 3/041*   (2006.01)
*G06K 9/00*   (2006.01)
(Continued)

(52) U.S. Cl.
CPC .............. *G06F 3/0414* (2013.01); *G06F 3/02* (2013.01); *G06F 21/32* (2013.01);
(Continued)

(58) Field of Classification Search
None
See application file for complete search history.

(56) References Cited

U.S. PATENT DOCUMENTS 7,784,366 B2 * 8/2010 Daverman .............. G01L 1/142
  73/780
8,922,979 B2  12/2014 Fluhrer
(Continued)

FOREIGN PATENT DOCUMENTS

CN   200996878   12/2007
CN   202614433   12/2012
(Continued)

OTHER PUBLICATIONS

International Search Report for PCT/CN2016/073646, dated Apr. 27, 2016, 4 pages.

*Primary Examiner* — Duane N Taylor, Jr.
(74) *Attorney, Agent, or Firm* — Nixon & Vanderhye P.C.

(57) ABSTRACT

Pressure applied to the surface of a first panel is measured by a simple beam-type pressure-sensing assembly, said pressure-sensing assembly being in contact with the first panel and a second panel by means of first supports and a second support. When a user applies pressure to a pressing area, the pressure is transferred to an elastic bearing plate; the pressure is then evenly concentrated on the elastic bearing plate; having pressure applied thereto, the elastic bearing plate is then deformed; a pressure sensor detects the deformation of the elastic bearing plate, and then the pressure sensor outputs a pressure signal to a pressure-sensing detection circuit to analyze, process, and then output to a processor for execution of an operation.

14 Claims, 6 Drawing Sheets

(51) Int. Cl.
*H03K 17/97* (2006.01)
*H03K 17/975* (2006.01)
*G06F 3/02* (2006.01)
*G06F 21/32* (2013.01)
*H03K 17/96* (2006.01)

(52) U.S. Cl.
CPC ..... *G06K 9/00006* (2013.01); *G06K 9/00013* (2013.01); *H03K 17/97* (2013.01); *H03K 17/975* (2013.01); *G06F 3/041* (2013.01); *G06F 2203/04105* (2013.01); *H03K 17/96* (2013.01)

(56) References Cited

U.S. PATENT DOCUMENTS

| | | | |
|---|---|---|---|
| 10,048,789 B2 * | 8/2018 | Filiz | G06F 3/0414 |
| 10,126,185 B2 * | 11/2018 | Watanabe | G01L 1/205 |
| 2012/0106051 A1 | 5/2012 | Fluhrer | |

FOREIGN PATENT DOCUMENTS

| | | |
|---|---|---|
| CN | 202887136 | 4/2013 |
| CN | 204652340 | 9/2015 |
| CN | 204965380 | 1/2016 |
| WO | WO 2011/003912 | 1/2011 |

* cited by examiner

PRESSURE SENSING APPARATUS AND ELECTRONIC DEVICE HAVING SAID PRESSURE SENSING APPARATUS

This application is the U.S. national phase of International Application No. PCT/CN2016/073646 filed 5 Feb. 2016, which designated the U.S. and claims priority to CN Patent Application No. 201510306889.0 filed 5 Jun. 2015, the entire contents of each of which are hereby incorporated by reference.

TECHNICAL FIELD

The present application relates to the technical field of pressure sensing, and more particularly, relates to a pressure sensing apparatus and an electronic device having the pressure sensing apparatus.

BACKGROUND

In the prior art, most pressure sensing apparatus are capacitive or inductive pressure sensing apparatus, which have bad stability performances under an external impact, and have a high requirement for the structural assembly accuracy and thus need to sustain a higher relative smoothness. Meanwhile, electronic devices in the prior art, such as cell phones and tablets, achieve startup, shutdown, and a volume adjustment thereof using mechanical press buttons. Please refer to FIG. 1, since mechanical press buttons need a certain key stroke distance to be enabled, it needs to arrange a mounting hole 2011 configured for receiving a mechanical button cap 202 on a first panel 201. When a user presses the mechanical button cap 202, a mechanical button stroke control strip 203 is inwardly compressed, a mechanical button circuit 204 can be activated only when the mechanical button stroke control strip 203 reaches a certain key strip, so that a system is enabled to identify a key-press information. The mechanical buttons in the prior art are inconvenient for a whole structural design of the electronic device, they have larger space occupation and thus are inconvenient for an antenna arrangement, and the electronic device is prone to get a water intrusion due to an existence of the mounting hole; what's worse, a whole structural strength of the electronic device is weaken to some extent. Meanwhile, due to limitation on life time of the mechanical buttons, a user operation may be affected, and there is a worse reliability. The electronic devices in the prior art may be provided with capacitive mechanical buttons, however, the capacitive mechanical buttons are prone to be unintendedly touched, and are not good for key-press operations.

Technical Problem

The present application is implemented as follows: a pressure sensing apparatus comprising:
  a first panel;
  a second panel spaced apart from the first panel, wherein an accommodation space is formed between the first panel and the second panel;
  a pressure sensing assembly placed in the accommodation space, wherein, the pressure sensing assembly comprises an elastic bearing plate and a pressure sensor, the elastic bearing plate and the pressure sensor abut against each other along a thickness direction of the first panel, the pressure sensing assembly is provided with a first mounting surface and a second mounting surface that is opposite to the first mounting surface along the thickness direction of the first panel, the first mounting surface is provided thereon with a first support, the second mounting surface is provided thereon with two second supports arranged to be spaced apart from each other, the first support is disposed in a region between the two second supports; the pressure sensing assembly, the first support and two second supports constitute a simple beam-type structure, the pressure sensing assembly is in contact with the first panel and the second panel by means of the first support and the second support, the first panel forms a pressing area in a region between the two second supports;
  a pressure-sensing detection circuit electrically connected with one or more pressure sensors and configured for receiving pressing signals collected by the pressure sensor; and
  a processor electrically connected with the pressure-sensing detection circuit, which is configured for outputting an operation signal when receiving the pressure signal from the pressure-sensing detection circuit.

Another purpose of the present application is providing an electronic device comprising the pressure sensing apparatus.

Advantageous Effects

Compared with the prior art, the technical advantageous effects of the present application are: in the present application, pressures acted on the surface of the first panel are measured through the simple beam-type pressure sensing assembly, and the pressure sensing assembly is in contact with the first panel and the second panel through the first support and the second supports. When a user applies a pressure on the pressing area, the pressure is transmitted from the first panel to a support that abuts against the first panel, then the pressure is transmitted to the elastic bearing plate. At the same time, since the second panel is fixed on the first panel, a reactive force of the applied force from the user acts on a support which abuts against the second panel, so that all pressures are concentrated on the elastic bearing plate. The elastic bearing plate becomes deformed under the actions of the pressures. The pressure sensor detects a deformation of the elastic bearing plate and outputs a pressure signal to the pressure-sensing detection circuit, where the pressure signal is analyzed and processed, and is output to the processor so as to perform an action. The pressure sensing apparatus has a smaller space occupation, is convenient for an antenna arrangement, and also overcomes conditions that mounting holes and mechanical keys are prone to cause water penetration into the electronic device, that a structural strength of a whole product is weaker, and that a reliability of the product is worse; moreover, the pressure sensing apparatus can avoid an unintended touching, is easy to be manufactured, and has a much lower requirement for the structural assembly accuracy.

TABLE 1

Figure 1:
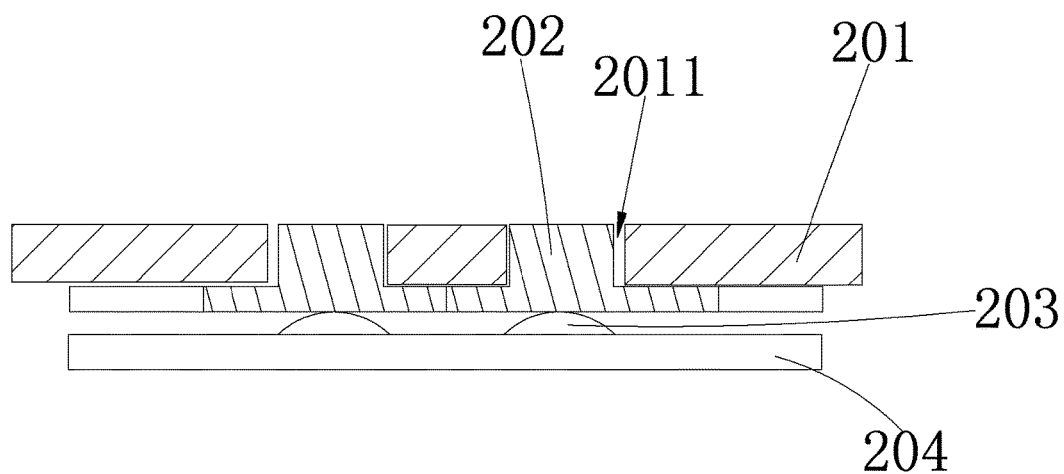
FIG. 1 illustrates a structural schematic view of an electronic device in the prior art.

| First panel 10 | Second panel 20 | Accommodation space 50 |
|---|---|---|
| First structural frame of electronic device | Pressure sensing assembly 30 | Electronic device 100 |
| Second structural frame of electronic device | First mounting surface 30a | Terminal device structural frame 201 |
| Pressing area 11 | Second mounting surface 30b | Mounting hole 2011 |
| Front side wall 12 | Elastic bearing board 31 | Mechanical button cap 202 |
| Rear side wall 13 | Pressure sensor 32 | Mechanical button stroke control strip 203 |
| Side frame 14 | First support 34 | Mechanical button circuit 204 |
| Mounting hole 15 | Second support 33 | |
| Information collecting button 16 | Third adhesive body 35 | |

DETAILED DESCRIPTION OF THE PREFERRED EMBODIMENTS

In order to make the purpose, the technical solution and the advantages of the present application be clearer and more understandable, the present application will be further described in detail below with reference to accompanying figures and embodiments. It should be understood that the specific embodiments described herein are merely intended to illustrate but not to limit the present application.

Figure 2:
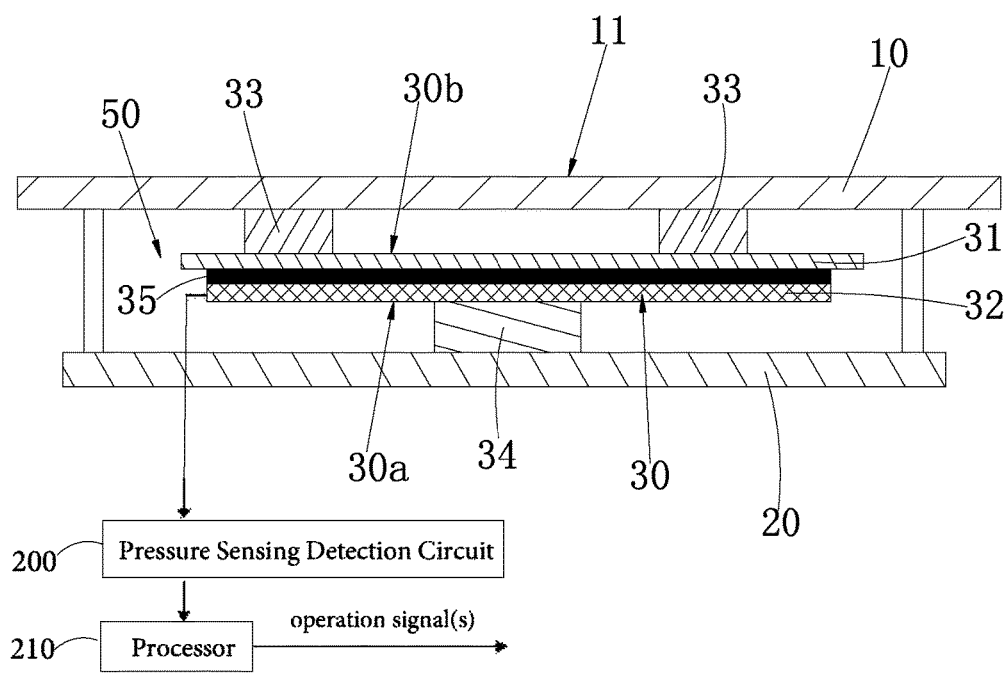
FIG. 2 illustrates a structural schematic view of a pressure sensing apparatus provided by a first embodiment of the present application.

Please refer to FIG. 2, a first embodiment of the present application provides a pressure sensing apparatus comprising:

a first panel 10;

a second panel 20 arranged to be spaced apart from the first panel 10, wherein an accommodation space 50 is formed between the first panel 10 and the second panel 20;

a pressure sensing assembly 30 received in the accommodation space 50, wherein, the pressure sensing assembly 30 comprises an elastic bearing plate 31 and a pressure sensor 32, the elastic bearing plate 31 and the against the pressure sensor 32 abut against each other along a thickness direction of the first panel 10, the pressure sensing assembly 30 is provided with a first mounting surface 30a and a second mounting surface 30b that is opposite to the first mounting surface 30a along the thickness direction of the first panel 10; the first mounting surface 30a is provided thereon with a first support 34, the second mounting surface 30b is provided thereon with two supports 33 arranged to be spaced apart from each other, the first support 34 is disposed in a region between the two second supports 33; the pressure sensing assembly 30, a first support 34 and two second supports 33 constitute a simple beam-type structure, the pressure sensing assembly 30 is in contact with the first panel 10 and the second panel 20 through the first support 34 and the second supports 33; the first panel 10 forms a pressing area 11 in a region between the two second supports 33;

a pressure-sensing detection circuit 200 electrically connected with the pressure sensor 32, which is configured for receiving pressure signals collected by the pressure sensor 32; and a processor 210 electrically connected with the pressure-sensing detection circuit 200, which is configured for outputting an operation signal when receiving a pressure signal from the pressure-sensing detection circuit 200.

In the present application, pressures acted on a surface of the first panel 10 is measured through a type of simple beam-type pressure sensing assembly 30, and the pressure sensing assembly 30 is in contact with the first panel 10 and the second panel 20 through the first support 34 and the second supports 33. When a user applies a pressure on the pressing area 11, the pressure is transmitted from the first panel 10 to the second supports 33 that abuts against the first panel 10, then the pressure is transmitted to the elastic bearing plate 31. At the same time, since the second panel 20 is fixed on the first panel 10, a reactive force of an applied force of the user acts on the support which abuts against the second panel 20, so that all pressures are concentrated on the elastic bearing plate 31. The elastic bearing plate 31 becomes deformed under the action of the pressures. The pressure sensor 32 detects a deformation of the elastic bearing plate 31, the pressure sensor 32 outputs a pressure signal to the pressure-sensing detection circuit 200, where the pressure signal is analyzed and processed, and is output to the processer 210 so as to perform an action. The pressure sensing apparatus has a smaller space occupation, is convenient for an antenna arrangement, and also overcomes conditions that mounting holes 15 and mechanical keys are prone to cause water penetration into the electronic device 100, that a structural strength of a whole product is weaker, and that the product has a worse reliability; moreover, the pressure sensing apparatus can avoid an unintended touch, is easy to be manufactured, and has a lower requirement for a structural assembly accuracy.

The elastic bearing plate 31 is a plate material having a certain thickness and elastic deformation. The elastic bearing plate 31 is provided with the elastic deformation, under the action of certain intense external applied force, the plate material can still return to its original state in time all by itself, and keep its functions and characteristics unchanged. The elastic bearing plate 31 has a certain thickness, and different thicknesses are provided with different maximum extents of acceptable deformations. The pressure sensor 32 is a thin film pressure sensor which comprises a pressure sensing layer and a pressure sensing component disposed on the pressure sensing layer, the pressure sensing component is a coat or a circuit having a pressure sensing function. The thin film pressure sensor belongs to the prior art, and thus is not repeatedly described again. The second panel 20 is shaped as a piece, the second panel 20 is arranged to be fixed on the first panel 10, and is configured for fixing the pressure sensing assembly 30 to ensure that the pressure sensing assembly has a fixed location and can bear force evenly. Preferably, the second panel 20 is a metal fixing strip having certain thickness and intensity. The elastic bearing plate 31 and the pressure sensor 32 can also be an integrally molded structure or an assembly structure.

As for a pressure sensing apparatus, there are two supports 33 which are fixed at a same side of the elastic bearing plate 31, and there is a first support 34 which is fixed at another side of the elastic bearing plate 31. The second supports 33, the elastic bearing plate 31, the pressure sensor 32 together with the first support 34 constitute a simple beam-type pressure sensing assembly 30 together, the pressure sensing assembly 30 has functions of strain-transferring and pressure sensing concentration. When a pressure is applied on the pressing area 11, the pressure sensing assembly 30 can convert the pressure perpendicular to the first panel 10 into a bending deformation of the simple beam-type. When the elastic bearing plate 31 is bent to be deformed, the pressure sensor 32 can identify a bending of the elastic bearing plate 31, and thereby detect a pressure applied on the first panel 10 from outside. Meanwhile, by pressing an area between the two second supports 33 corresponding to the first panel 10, the applied force can be transmitted to the pressure sensing assembly 30. At the same time, all deformations of the simple beam-type caused by the pressure are concentrated at a location corresponding to the first support 34, in this way, a pressure concentration is achieved.

Further, the first mounting surface 30a is formed on the pressure sensor 32 and is arranged to be opposite to the second panel 20, the second mounting surface 30b is formed on the elastic bearing plate 31 and is arranged to be opposite to the first panel 10; the first support 34 is connected between the second panel 20 and the pressure sensor 32, two second supports 33 are connected between the first panel 10 and the elastic bearing plate 31. This arrangement can form the simple beam-type pressure sensing assembly 30 configured to measure the pressure applied on the surface of the first panel 10.

Furthermore, the first mounting surface 30a is provided thereon with a first adhesive body 33, and the first adhesive body 33 forms the first support 34; the second mounting surface 30b is provided thereon with two second adhesive bodies 34, and the two second adhesive bodies 34 form two second supports 33. In this embodiment, the first panel 10 is adhered with the elastic bearing plate 31 through the first adhesive body 33, and the pressure sensor 32 is adhered to the second panel 20 through the second adhesive bodies 34. The first adhesive body 33 and the second adhesive bodies 34 can not only form supports of the simple beam-type, but also facilitate an assembling of the pressure sensing assembly 30. It can be understood that, the second supports 33 and the first support 34 can also be realized by other mechanical connections, such as welding. Alternatively, the second supports 33 are integrally molded with the first panel 10, the first support 34 is integrally molded with the second panel 20, while the elastic bearing plate 31 and the pressure sensor 32 are arranged to be clamped between the second supports 33 and the first support 34, as long as the simple beam-type pressure sensing assembly 30 is constituted.

Furthermore, the pressure sensing assembly 30 further comprises a third adhesive body 35 configured for adhering the elastic bearing plate 31 with the pressure sensor 32. The elastic bearing plate 31 is connected with the pressure sensor 32 through the third adhesive body 35. This structure facilitates the assembly of the elastic bearing plate 31 and the pressure sensor 32.

Furthermore, the first panel 10 is an intermediate frame, a front shell or a back shell, a thickness range of the pressing area 11 is between 0.3 mm and 5 mm. Preferably, the thickness range of the pressing area 11 is between 0.5 mm and 2 mm. The intermediate frame, the front shell or the back shell is referred to as components generated by designing and processing the electronic device 100. The intermediate frame, the front shell or the back shell can be made of metal material, such as stainless steel, aluminum magnesium alloy, or the like, they can also be made of composite material, such as ABS (Acrylonitrile Butadiene Styrene Acrylonitrile Butadiene Styrene), PC (Polycarbonate), etc. Preferably, a thickness of the pressing area 11 is 1 mm. Alternatively, the first panel 10 is a touch screen, a display screen, or a display screen that integrates touching and displaying, the thickness range of the pressing area is between 0.1 mm and 5 mm. Preferably, the thickness range of the pressing area 11 is between 0.5 mm and 5 mm. Definition of the thickness range of the pressing area 11 is used for adhering the pressure sensor 32 and ensuring sensitivities of keys. A structural strength of the first panel 10 needs to be ensured, such that a product can be avoided from being fractured and deformed under the action of external force of the user.

Furthermore, the first adhesive body 33 is a double sided adhesive, an acrylic form adhesive, a UV (Ultraviolet Rays) adhesive, a AB adhesive (Epoxy Resin Adhesive) or a silica gel; the second adhesive body 34 is the double sided adhesive, the acrylic form adhesive, the UV adhesive, the AB adhesive or the silica gel; and the third adhesive body 35 is the double sided adhesive, the acrylic form adhesive, the UV adhesive, the AB adhesive or the silica gel. It can be understood that, other adhesive bodies can also be selected to be used for the first adhesive body 33, the second adhesive body 34 and the third adhesive body 35.

Furthermore, the second panel 20 is mechanically connected to the first panel 10. In particular, a mechanical connection between the second panel 20 and the first panel can be a fastening connection, a welding connection, a snap-fit connection, or be some other types of mechanical connections. Such mechanical connection can provide a firm and stable connection which won't slowly change or abate along with a change in time and environment. Alternatively, the second panel 20 and the first panel 10 are shaped as an integrally molded structure, that is, a fixing structure pre-designed on the first panel 10.

Figure 3:
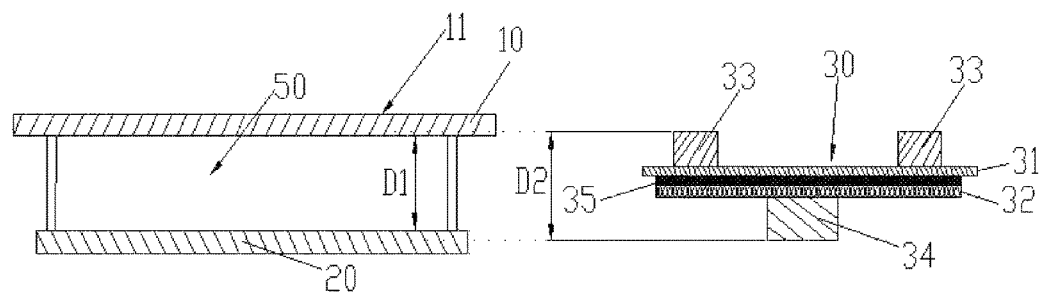
FIG. 3 illustrates an exploded schematic view of the pressure sensing apparatus shown in FIG. 3.

Furthermore, please refer to FIG. 3 simultaneously, a distance for receiving the pressure sensing assembly 30 between the second panel 20 and the first panel 10 is pre-arranged; a total thickness of the pressure sensing assembly 30 is larger than distance D1 between the second panel 20 and the first panel 10; in this way, the pressure sensing assembly 30 is always in a state of interference fit in an assembling process; in particular, the pressure sensing assembly 30 is always in a compressed state after it is assembled, the compressed state will be balanced after assembling, pressures inputted from the surface of the first panel 10 can be sensitively detected. Furthermore, the total thickness of the pressure sensing assembly 30 is 1.05 times or 1.5 times of the distance between the second panel 20 and the first panel 10. Preferably, the total thickness of the pressure sensing assembly 30 is 0.9 mm, and the distance between the second panel 20 and the first panel 10 is 0.8 mm. It can be understood that, the total thickness of the pressure sensing assembly 30 can also be equal to or less than the distance D1 between the second panel 20 and the first panel 10; however, this design solution has an unsatisfactory effect in detection of surface pressure.

Furthermore, the pressing area 11 is provided thereon with a press button identifier for identifying the pressure sensing assembly 30 that facilitates a user operation. A center position of the pressure sensor 32 is corresponding one to one to a center position identified by the press button.

Furthermore, the elastic bearing plate 31 is a metal piece or a plastic injection part. Preferably, the elastic bearing plate 31 is a stainless steel sheet having a thickness of 0.4 mm; or, the elastic bearing plate 31 is an ABS sheet material having a thickness of 0.6 mm.

Please refer to FIG. 2, a first embodiment of the present application provides a pressure sensing apparatus, the pressure sensing apparatus is applied in switch buttons, volume buttons, and function buttons of the electronic device 100. A pressure-sensing detection circuit 200, which is electrically connected with the pressure sensor 32, is configured for identifying a pressure signal of the user, analyzing and processing pressure information of the user collected by the pressure sensor 32, and outputting a processing result. A processor 210, which is electrically connected with the pressure sensor 32, is configured for providing a switch signal, a volume adjustment signal or some other operation signals according to pressure information provided by the pressure sensor 32. Both the pressure-sensing detection circuit 200 and the processor 210 belong to the prior art.

If the pressure sensing apparatus is applied as a switch button, when a switch signal is received, the processor 210 collects pressure information and time information that the user presses at the location of the press button, analyzing and processing the collected pressure information and time information, and outputting the switch signal.

If the pressure sensing apparatus is applied as a volume button, when a volume adjustment signal is received, the processor 210 collects the pressure information and the time information that the user presses at the location of the volume button, and calculates pressing numbers, analyzing and processing the collected pressure information and time information, and outputting a volume adjustment signal according to the pressing numbers.

It can be understood that, it is possible to arrange a plurality of simple beam-type pressure sensing assemblies 30 for measuring pressures acted at different areas of the surface of the first panel 10 by arranging even more first supports 34 and second supports 33 between the first panel 10 and the second panel 20.

Figure 4:
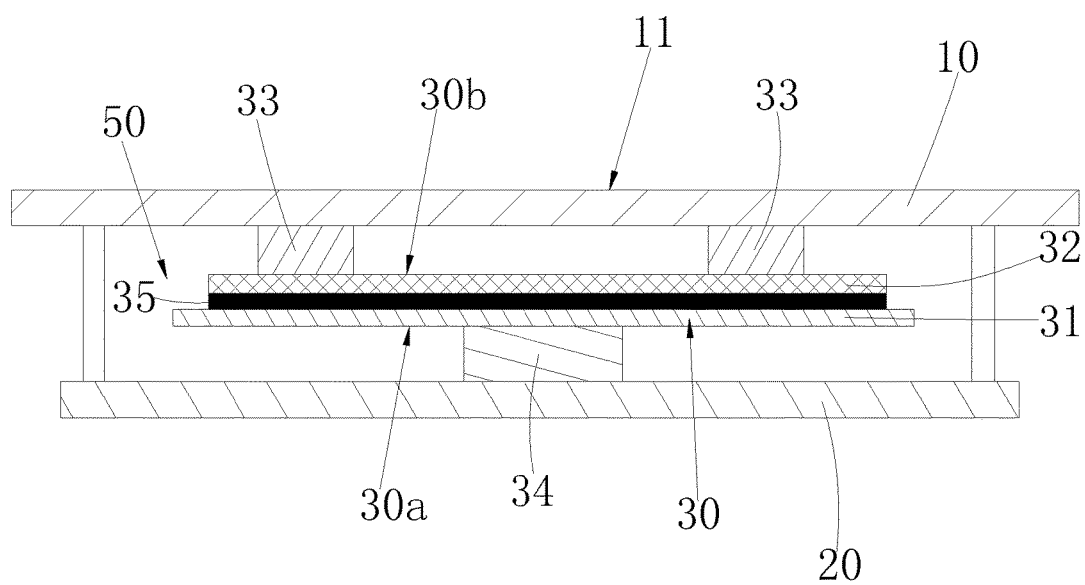
FIG. 4 illustrates a structural schematic view of the pressure sensing apparatus provided by a second embodiment of the present application.
Figure 5:
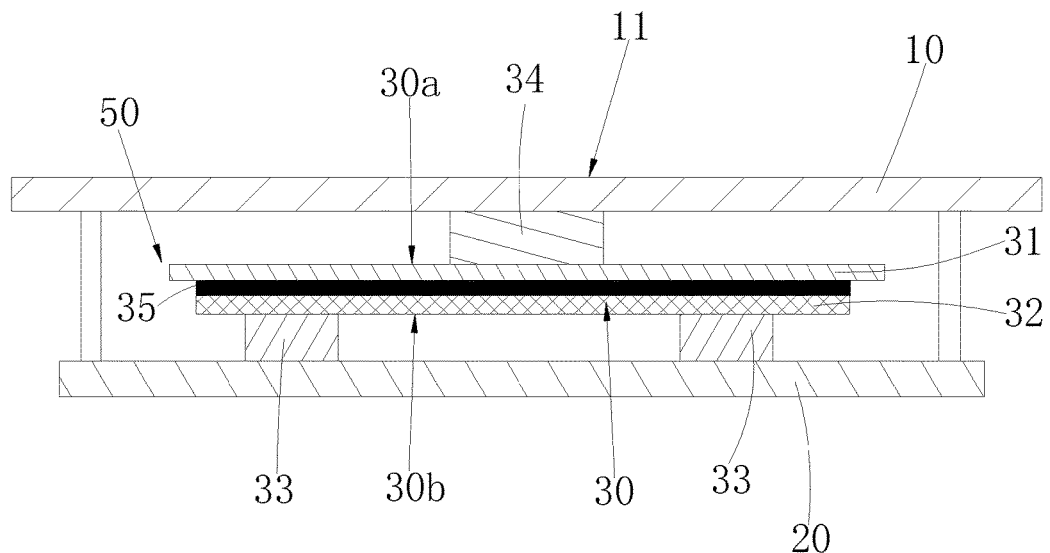
FIG. 5 illustrates a structural schematic view of the pressure sensing apparatus provided by a third embodiment of the present application.

Please refer to FIG. 4, a pressure sensing apparatus provided by a second embodiment of the present application is substantially similar to the pressure sensing apparatus provided by the first embodiment of the present application, and differs from the first embodiment in that: the first mounting surface 30a is formed on the elastic bearing plate 31 and is arranged to be opposite to the second panel 20, the second mounting surface 30b is formed on the pressure sensor 32 and is arranged to be opposite to the first panel 10, the first support 34 is connected between the first panel 10 and the elastic bearing plate 31, two second supports 33 are connected between the second panel 20 and the pressure sensor 32. This arrangement can form the simple beam-type pressure sensing assembly 30 so as to measure pressures acted on the surface of the first panel 10.

Figure 6:
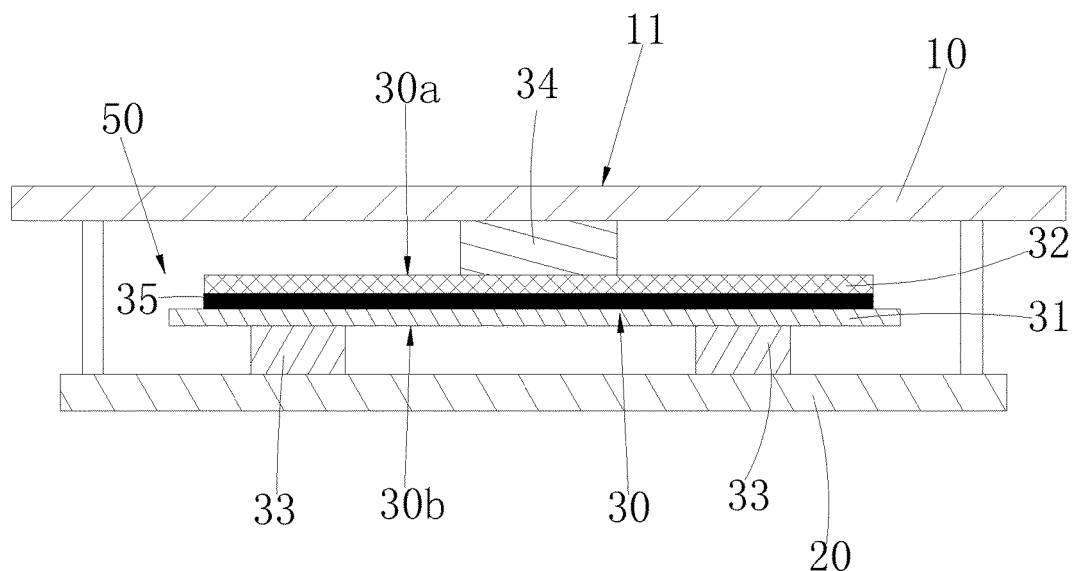
FIG. 6 illustrates a structural schematic view of the pressure sensing apparatus provided by a fourth embodiment of the present application.

Please refer to FIG. 6, a pressure sensing apparatus provided by a fourth embodiment of the present application is substantially similar to the pressure sensing apparatus provided by the first embodiment, and differs from the first embodiment in that: the first mounting surface 30a is formed on the pressure sensor 32 and is arranged to be opposite to the first panel 10, the second mounting surface 30b is formed on the elastic bearing plate 31 and is arranged to be opposite to the second panel 20, the first support 34 is connected between the first panel 10 and the pressure sensor 32, two second supports 33 are connected between the second panel 20 and the elastic bearing plate 31. This arrangement can form the simple beam-type pressure sensing assembly 30 so as to measure the pressures acted on the surface of the first panel 10.

Figure 7:
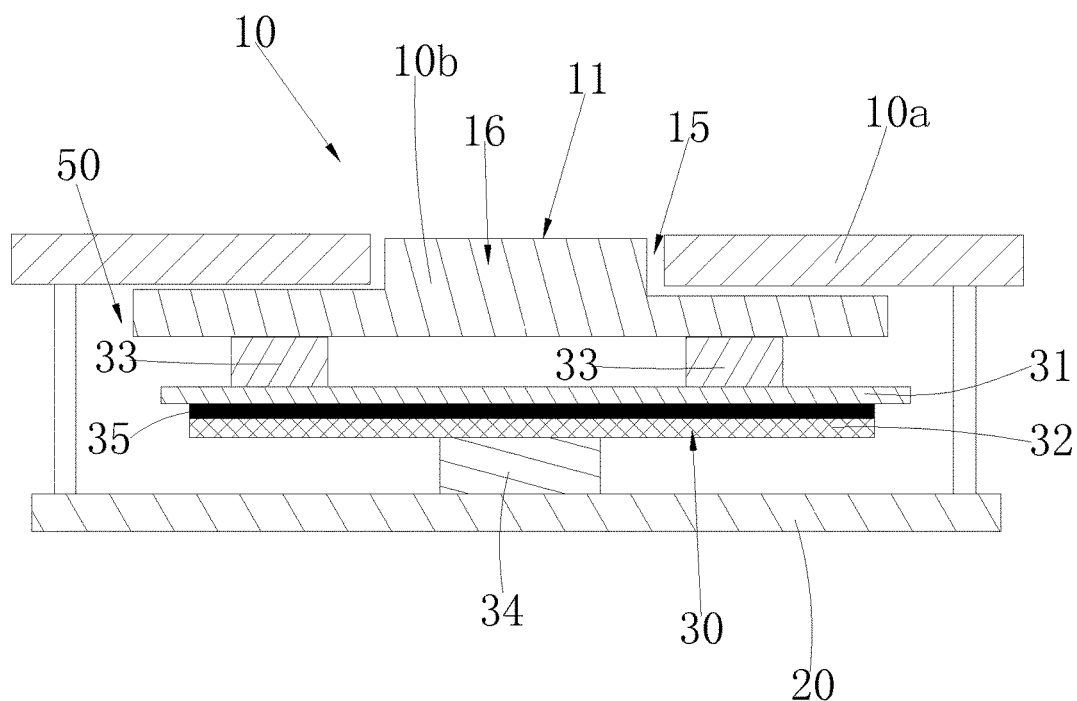
FIG. 7 illustrates a structural schematic view of the pressure sensing apparatus provided by a fifth embodiment of the present application.

Please refer to FIG. 7, a pressure sensing apparatus provided by a fifth embodiment of the present application is substantially similar to the pressure sensing apparatus provided by the first embodiment, and differs from the first embodiment in that: the first panel 10 is divided into a first structural frame 10a of electronic device and a second structural frame 10b of electronic device, the first structural frame 10a of electronic device is provided thereon with a mounting hole 15, the second structural frame 10b of electronic device is a fingerprint identification module having an information collecting button 16, the information collecting button 16 is inserted into the mounting hole 15 and the pressing area 11 is located on the information collecting button 16, the second panel 20 is arranged to be spaced apart from a side of the fingerprint identification module away from the pressing area 11, the pressure sensing assembly 30 is in contact with the fingerprint identification module and the second panel 20 through the first support 34 and the second supports 33.

Furthermore, two second supports 33 are located on the fingerprint identification module and the first support 34 is located on the second panel 20, the elastic bearing plate 31 is connected with two second supports 33, the pressure sensor 32 is connected with the first support 34, and the elastic bearing plate 31 abuts against the pressure sensor 32 along a thickness direction of the first structural frame 10a of the electronic device. It can be understood that, a location of the elastic bearing plate 31 can be mutually exchanged with a location of the pressure sensor 32; moreover, a location of the first support 34 along the thickness direction of the first panel 10 can be mutually exchanged with a location of the second supports 33 along the thickness direction of the first panel 10a, all of the aforesaid solutions can achieve a pressure sensing function of the simple beam-type pressure sensing assembly 30.

A fingerprint/optical identification module collects fingerprint information or optical information through the information collecting button 16, the fingerprint/optical identification module belong to the prior art, and thus are not repeatedly described again. The pressure sensing assembly 30 is arranged to be attached to a bottom of the fingerprint/optical identification module, meanwhile, the second panel 20 is arranged to be fixed on the first structural frame 10a of electronic device, and serves as a pressure switch circuit that is capable of performing a fingerprint/optical identification. When a user is manipulating the fingerprint/optical identification module, the fingerprint/optical identification module detects a magnitude of the applied pressure of the user at the time when it identifies user fingerprint information or optical information. A pressure identification circuit outputs pressure information to a processor, the fingerprint/optical identification module outputs a fingerprint/optical information to the processor, the processor outputs actions of power on/off and so on after it identifies the pressure information, and simultaneously judges whether an unlocking/encryption operation needs to be accomplished or not, thereby achieving combining fingerprint/optics, startup and shutdown, or functions of other buttons into one. This solution has solved a problem that it still needs to additionally arrange a plurality of mechanical press buttons after the electronic device has been provided with the fingerprint/optical identification module. A number of arranged press buttons is reduced, a convenience of design is improved, and user experience is enhanced.

Figure 8:
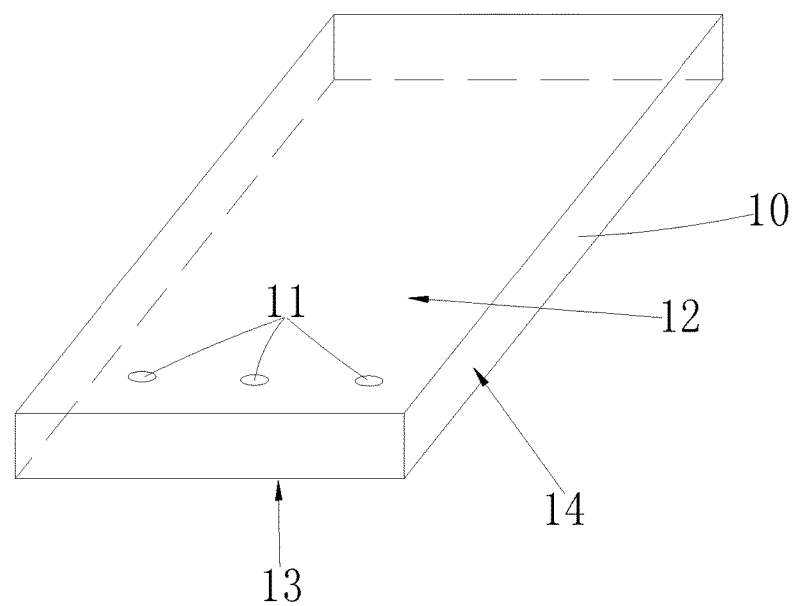
FIG. 8 illustrates a perspective schematic view of the electronic device provided by the first embodiment of the present application.

Please refer to FIG. 2 and FIG. 8, an electronic device 100 provided by the first embodiment of the present application comprises a pressing sensing device. A first panel 10 has a front side wall 12, a rear side wall 13 arranged to be spaced apart from the front side wall 12, and a side frame 14 arranged between the front side wall 12 and the rear side wall 13. A pressing area 11 is formed on the front side wall 12, a pressure sensing assembly 30 is arranged on a side of the front side wall 12 away from the pressing area 11. The front side wall 12 can be a touch screen, a display screen or a front surface frame. A pressure sensor is pre-arranged at an underneath of a touch screen, a display screen or a front surface frame at the front side of the electronic device 100; at this time, the touch screen, the display screen or the front surface frame are defined as the first panel 10. The pressing area 11 on the pressure sensing assembly 30 serves as function buttons of the electronic device 100, such as "menu", "return", "home page", and so on.

Figure 9:
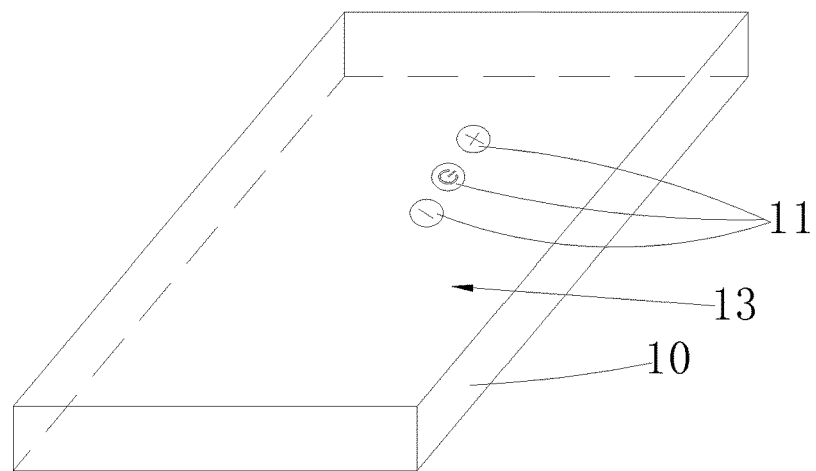
FIG. 9 illustrates a perspective schematic view of the electronic device provided by the second embodiment of the present application.

Please refer to FIG. 2 and FIG. 9, an electronic device 100 provided by the second embodiment of the present application is substantially similar to the electronic device 100 provided by the first embodiment, and differs from the first embodiment in that: the pressing area 11 is formed on the rear side wall 13, the pressure sensing assembly 30 is arranged on a side of the rear side wall 13 away from the pressing area 11. The rear side wall 13 is referred to as a back shell. The pressure sensor 32 is adhered to an inner side of the back shell, and achieves button functions by an assembly of the back shell and the electronic device 100. A switch button and a volume button are arranged on a rear case of the electronic device 100. Meanwhile, the pressure button can also be defined as other types of buttons, an original design of press buttons on the side of the electronic device 100 is abandoned, the design of buttons is moved onto the rear case of the electronic device 10. The mechanical press buttons are removed, such that a product design can ensure an integrative beauty and improve a three-proof performance of a product at the same time.

Figure 10:
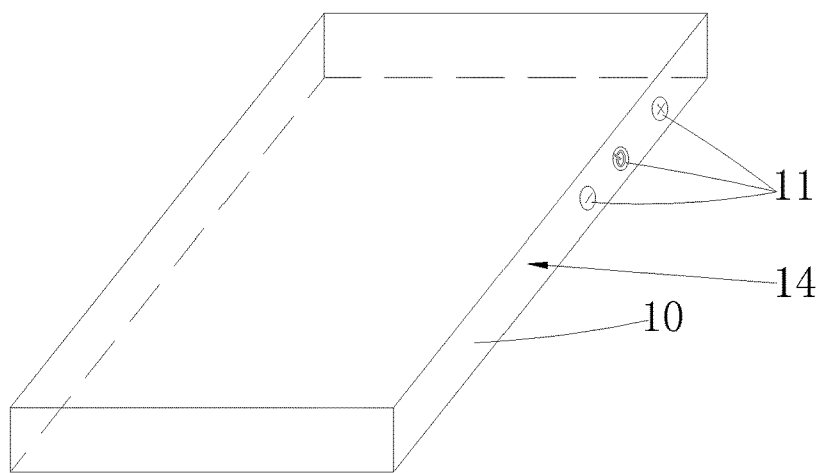
FIG. 10 illustrates a perspective schematic view of the electronic device provided by the third embodiment of the present application.

Please refer to FIG. 2 and FIG. 10, an electronic device 100 provided by the third embodiment of the present application is substantially similar to the electronic device 100 provided by the first embodiment, and differs from the first embodiment in that: the pressing area 11 is formed on the side frame 14, the pressure sensing assembly 30 is arranged on a side of the side frame 14 away from the pressing area 11. The side frame 14 no longer utilizes a structure of mounting hole in the prior art (shown in FIG. 1), but turn to utilize an integrated structural design solution. The pressure sensing assembly 30 is adhered to the inner side of the lateral of the first panel 10 to achieve original functions of startup and shutdown, volume up, and volume down. A condition that a structural strength is reduced due to the structure of the mounting hole of the first panel 10, and bending and fracture of the electronic device 100 may occur in some cases has been solved. Meanwhile, an integration design removes the mechanical press buttons, and provides more selections for achieving such as an appearance beautification, a water proof function, and so on.

Figure 11:
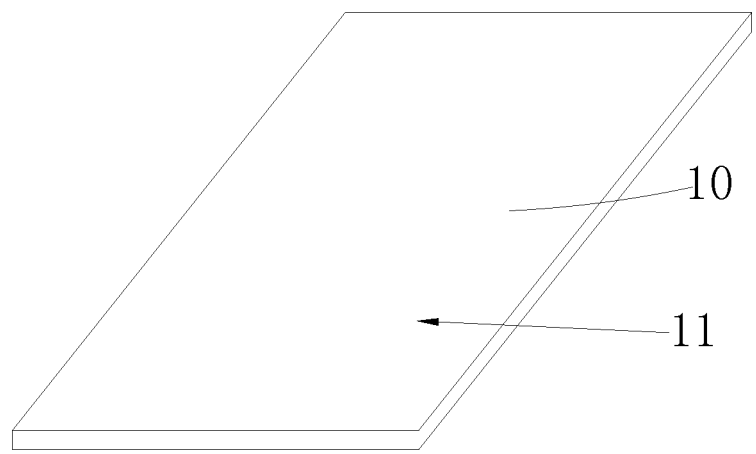
FIG. 11 illustrates a perspective exploded view of the electronic device provided by the fourth embodiment of the present application.
Figure 11:
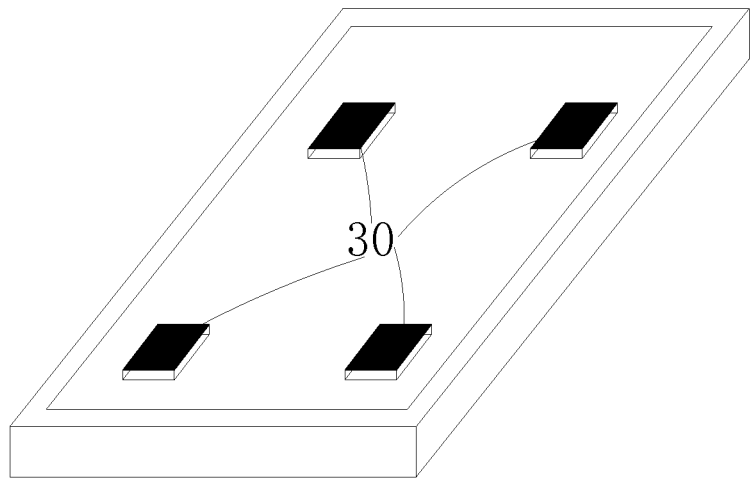

Please refer to FIG. 2 and FIG. 11, an electronic device 100 provided by the fourth embodiment of the present application is substantially similar to the electronic device 100 provided by the first embodiment, and differs from the first embodiment in that: the first panel 10 is a touch screen, a display screen or a display screen that integrates displaying with touching, at least two pressure sensing assemblies 30 are distributed on an inner side surface of the first panel 10, the pressure sensor 32 in each of the pressure sensing assemblies 30 is electrically connected with the processor 210 through a pressure-sensing detection circuit 200.

Specifically, by pre-arranging four or more than four pressure sensing assemblies 30 at an underneath of the display screen, and making the pressure sensing assemblies 30 be distributed at the back of the display screen according to certain arrangement, the structural stability of the first panel 10 is ensured. Meanwhile, the second panel 20 is formed by such as the intermediate frame, the side frame of the electronic device 100, there is a mechanical connection between the second panel 20 and the first panel 10. Said mechanical connection can be a flexible connection formed by using a double side adhesive tape, a VHB (Very High-intensive Adhesive Bonding), or be a higher hardness connection formed by using a UV fluid dispensing, silica gel.

When the user presses on a surface of a touch screen, or a display screen, the pressure is transmitted from the touch screen, or the display screen to the pressure sensing assembly 30, thereby causing the elastic bearing plate 31 to be bent and deformed, the pressure sensor 32 detects a deformation of the elastic bearing plate 31, and outputs a pressure signal to the pressure-sensing detection circuit 200; the pressure-sensing detection circuit 200 detects data of four or even more pressure sensing assemblies 30 distributed on the underneath of the touch screen, or the display screen, performs a centralized processing for the data, and then transmits the data to the processor 210. The processor 210 can output a corresponding procedural operation according to touched location information obtained by the touch screen or the display screen in combination with pressure information detected by the pressure-sensing detection circuit 200.

The aforementioned embodiments are only preferred embodiments of the present application, and are not intended to limit the present application. Any modification, equivalent replacement, improvement, and so on, which are made within the spirit and the principle of the present application, should be included in the protection scope of the present application.

What is claimed is:

1. A pressure sensing apparatus comprising:
   a first panel;
   a second panel spaced apart from the first panel, wherein an accommodation space is formed between the first panel and the second panel;
   a pressure sensing assembly placed in the accommodation space, the pressure sensing assembly comprising an elastic bearing plate and a pressure sensor, the elastic bearing plate and the first panel abutting against each other along a thickness direction of the first panel, the pressure sensing assembly being provided with a first mounting surface and a second mounting surface opposite to each other along the thickness direction of the first panel, the first mounting surface being provided thereon with a first support, the second mounting surface being provided thereon with plural second supports arranged to be spaced apart from each other, the first support being disposed in a region between the plural second supports; the pressure sensing assembly, the first support and the plural second supports constituting a beam structure, the pressure sensing assembly abutting against and between the first panel and the second panel via the first support and the plural second supports, and the first panel forming a pressing area in a region between the plural second supports;
- a pressure-sensing detection circuit electrically connected with the pressure sensor and configured for receiving pressing signals detected by the pressure sensor; and
- a processor electrically connected with the pressure-sensing detection circuit and configured for outputting an operation signal when receiving the pressure signal from the pressure-sensing detection circuit.

2. The pressure sensing apparatus according to claim 1, wherein, the first mounting surface is formed on the pressure sensor and is arranged to be opposite to the second panel, the second mounting surface is formed on the elastic bearing plate and is arranged to be opposite to the first panel; the first support is connected between the second panel and the pressure sensor, and the plural second supports are connected between the first panel and the elastic bearing plate.

3. The pressure sensing apparatus according to claim 1, wherein, the first mounting surface is formed on the elastic bearing plate and is arranged to be opposite to the second panel, the second mounting surface is formed on the pressure sensor and is arranged to be opposite to the first panel, the first support is connected between the second panel and the elastic bearing plate, and the plural second supports are connected between the first panel and the pressure sensor.

4. The pressure sensing apparatus according to claim 1, wherein, the first mounting surface is formed on the elastic bearing plate and is arranged to be opposite to the first panel, the second mounting surface is formed on the pressure sensor and is arranged to be opposite to the second panel, the first support is connected between the first panel and the elastic bearing plate, and the plural supports are connected between the second panel and the pressure sensor.

5. The pressure sensing apparatus according to claim 1, wherein, the first mounting surface is formed on the pressure sensor and is arranged to be opposite to the first panel, the second mounting surface is formed on the elastic bearing plate and is arranged to be opposite to the second panel, the first support is connected between the first panel and the pressure sensor, and the plural supports are connected between the second panel and the elastic bearing plate.

6. The pressure sensing apparatus according to claim 1, wherein, the first mounting surface is provided with a first adhesive body, and the first adhesive body forms the first support; the second mounting surface is provided with plural second adhesive bodies, and the plural second adhesive bodies form the plural second supports, respectively.

7. The pressure sensing apparatus according to claim 1, wherein, the pressure sensing assembly further comprises a third adhesive body configured for adhering the elastic bearing plate with the pressure sensor.

8. The pressure sensing apparatus according to claim 1, wherein, the first panel is an intermediate frame, a front shell, a back shell, a touch screen, a display screen, or an integral display-touch screen, the pressing area of the intermediate frame, the front shell, or the back shell has a thickness between 0.33 mm and 5 mm, and the pressing area of the touch screen, the display screen, or the integral display-touch screen has a thickness between 0.1 mm and 5 mm.

9. The pressure sensing apparatus according to claim 1, wherein, the first panel is divided into a first structure frame of an electronic device and a second structure frame of the electronic device, the first structure frame of the electronic device being provided thereon with a mounting hole, the second structural frame of the electronic device comprising a fingerprint identifier having an information collecting button, the information collecting button being inserted into the mounting hole and the pressing area is located on the information collecting button, the second panel being arranged to be spaced apart from the fingerprint identifier, the pressure sensing assembly being contacted between the fingerprint identifier and the second panel through the first support and the plural second supports.

10. The pressure sensing apparatus according to claim 1, wherein, the first panel comprises a touch screen, a display screen or an integral display-touch screen, at least one of the pressure sensing assembly being distributed on an inner side surface of the first panel, and the pressure sensor in each pressure sensing assembly is electrically connected with the processor through the pressure-sensing detection circuit.

11. The pressure sensing apparatus according to claim 1, wherein, a total thickness of the pressure sensing assembly is larger than or equal to the gap between the second panel and the first panel.

12. The pressure sensing apparatus according to claim 1, wherein,
the first panel and the second panel are mechanically connected to each other or in an integrally formed structure.

13. An electronic device comprising the pressure sensing apparatus according to claim 1.

14. The electronic device according to claim 13, wherein, the electronic device has a front side wall, a rear side wall arranged to be spaced apart from the front side wall, and a side frame disposed between the front side wall and the rear side wall;
the pressing area is located on the front side wall, and the pressure sensing assembly is disposed on an inner side of the front side wall;
the pressing area is located on the rear side wall, and the pressure sensing assembly is disposed on an inner side surface of the rear side wall;
or
the pressing area is located on the side frame, and the pressure sensing assembly is disposed on an inner side surface of the side frame.

* * * * *